United States Patent
Maass et al.

(10) Patent No.: US 7,830,389 B2
(45) Date of Patent: Nov. 9, 2010

(54) DUAL PROCESSOR ACCELERATED GRAPHICS RENDERING

(75) Inventors: Scott R. Maass, Rio Rancho, NM (US); Nathan J. Meehan, Apalachin, NY (US); William R. Hancock, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1070 days.

(21) Appl. No.: 11/542,575

(22) Filed: Oct. 3, 2006

(65) Prior Publication Data

US 2008/0079736 A1    Apr. 3, 2008

(51) Int. Cl.
G06F 15/16    (2006.01)
G06F 9/46    (2006.01)
G06T 15/00    (2006.01)

(52) U.S. Cl. .................. 345/503; 345/522; 718/107
(58) Field of Classification Search ......... 345/501–503, 345/522, 530, 531, 541, 544; 718/107
See application file for complete search history.

(56) References Cited

U.S. PATENT DOCUMENTS

| | | | |
|---|---|---|---|
| 5,408,650 A * | 4/1995 | Arsenault | 717/124 |
| 6,249,294 B1 | 6/2001 | Lefebvre et al. | |
| 6,359,624 B1 | 3/2002 | Kunimatsu | |
| 6,525,738 B1 | 2/2003 | Devins et al. | |
| 6,675,289 B1 * | 1/2004 | Eslick et al. | 712/226 |
| 7,234,144 B2 * | 6/2007 | Wilt et al. | 718/104 |
| 7,586,493 B1 * | 9/2009 | Sams | 345/502 |
| 7,612,781 B2 * | 11/2009 | Washizu et al. | 345/543 |
| 2008/0208399 A1 | 8/2008 | Pham | |

OTHER PUBLICATIONS

Allen, D.; Electronic Flight Bag, AERO 23; Aug. 29, 2006, pp. 1-17, XP002496643; Retrieved from Internet: <URL: http://web.archive.org/whttp://web.archive.org/web/20060829084133/http://www.boeing.com/commercial/aeromagazine/aero_23/EFB_story.html> [retrieved on Sep. 22, 2008].
EP Search Report dated Apr. 23, 2009, EP 07117797.6.
SeaWind®/178 Certifiable OpenGL® Core API.

* cited by examiner

Primary Examiner—Joni Hsu
(74) Attorney, Agent, or Firm—Ingrassia Fisher & Lorenz, P.C.

(57) ABSTRACT

Dual processor accelerated graphics rendering is a method which allows for optimizing graphics performance using two processors and 3D hardware accelerators. This method allows for real time embedded systems to have multiple partitions to render to multiple windows with non-blocking graphics calls. One processor queues up graphics calls within a discrete time because they do not interface with the graphics accelerator hardware. The second processor supports the hardware accelerator with drivers operating in a single partition. This design abstracts the graphics calls from the native interface of the graphics hardware accelerator.

18 Claims, 3 Drawing Sheets

DUAL PROCESSOR ACCELERATED GRAPHICS RENDERING

BACKGROUND OF THE INVENTION

1. Field of the Invention (Technical Field)

The present invention relates to processing of graphics and more particularly to a method and apparatus for processing high order graphics languages, such as OpenGL®, for embedded systems, for multiple application tasks, and for partitions.

2. Background Art

Traditionally, applications which involve graphics are restricted by the capabilities of the rendering engine. Typically a single processor is used to execute the application and execute the drivers of the graphics rendering hardware. Applications are then tailored to accommodate the graphics rendering hardware. With the use of larger displays and multiple graphics windows as well as the need for time and space partitioned operating systems, there is a need for more complex tasking and partitioning. The problem is that all of the partitions and tasks eventually funnel back to a single hardware graphics engine which may impose the blocking of functions as rendering occurs. The existing overhead of processing graphics calls to drive the graphics processing unit (GPU) is exacerbated by any blocking in the graphics pipeline. In addition, the costs of developing drivers to keep up with the quickly outdated GPUs have created the need to use commercially available drivers that may not support the operating system of the legacy application.

Presently, a single processor communicating with graphics hardware at a fixed update rate slow enough for the display task to complete or having no fixed update rate is what is traditionally done. Embedded OpenGL® drivers operate in a single partition.

An example of this prior art systems is described in U.S. Pat. No. 6,525,738, entitled Display List Processor for Decoupling Graphics Subsystem Operations From a Host Processor, which teaches a method for a single application task, whereas this method allows for multiple application tasks.

Another prior art device is described in U.S. Pat. No. 6,249,294, entitled 3D Graphics in a Single Logical Screen Display Using Multiple Computer Systems which describes a method that uses a fifo to queue display lists. The present invention buffers by Windows and manages for multiple context/windows. The prior art method is for communication between computers, whereas this method is for a single embedded device.

Other prior art approaches include Microsoft Windows® for personal computers which can support multiple cores (SMP) and render displays using 3D hardware accelerators for graphics. Windows (SMP) allows multiple threads to operate on more than one core. X Windows GUI for Unix supports a client-server over a network method of OpenGL® operation. X Windows allows one computer to act as an OpenGL® client while another computer acts as an OpenGL® server over a network.

This invention is designed to optimize performance for graphics processors using multiple processors. Windows SMP does not allow a single thread such as OpenGL® application linked with a device driver to operate on more than one processor. The X Windows system uses a network style interface that requires decoding and encoding of X Windows system calls into OpenGL® calls. The X Windows system does not have the ability to statically configure the client server between separate processors on a single computer.

The problem has not been addressed by the prior art devices because using three dimensional (3D) hardware graphics accelerators needs a unique solution for real time embedded systems. Only recently has high end graphics capabilities been available in real time systems. Real time systems have typically limited tasking and windowing capabilities. Non real time operating systems do not support fixed update rates. Further, non real time operating systems do much of the windowing without 3D hardware graphics accelerators. Most operations are supported in two-dimensional (2D) only and 3D features are only supported in a single context.

There is a longstanding need to increase graphics performance. The present invention meets this need and provides for multiple application tasks rendered to a hardware graphics processor by using two processors when rendering to single screen. This improves graphics throughput and allows complex tasking/partitioning for application software and allows: any task of any partition to render to any graphics window.

SUMMARY OF THE INVENTION (DISCLOSURE OF THE INVENTION)

The present invention is a method and apparatus using dual processor accelerated graphics rendering which allows for optimizing graphics performance using two processors and three dimensional (3D) hardware accelerators on at least one screen. Each processor has an independent operating system executing. One processor is dedicated to running applications, and the other processor is dedicated to driving the graphics hardware. In state-of-the-art systems graphics rendering throughput is slowed by operations done on the processor prior to transferring data across the bus, limitations of the bus, overhead of coordination between central processing unit (CPU) and graphics hardware, as well as the time needed for the graphics rendering. Separating these activities from the application results in more time for applications and allows for graphics rendering without blocking functions. In general, graphics execution can be done in parallel with processor execution; however, there are certain functions that force the processor to wait for the graphics hardware; these are called blocking functions.

The first processor no longer interacts with the graphics hardware; it only needs to communicate with the second processor. The second processor does the communication to the graphics hardware in a more methodical fashion than the application processor would be capable of. This is especially true if the application processor is being interrupt driven or has excessive time partitioning.

Multiple tasks and address spaces have the ability to render into multiple graphics windows for real time embedded systems by implementing this capability through two processors with shared resources. This also allows for only updating the portion of the screen that is changing.

A primary object of the present invention is to optimize performance for graphics processors using multiple processors.

A primary advantage of the present invention is the flexibility in time and space partitioning, that the application tasks are allowed.

Another advantage is that a windowing system is feasible for all windows to be rendered using hardware acceleration in a real time system.

A further advantage is the gain in graphics performance by separating the interaction between the application processor and graphics hardware, so that the application processor is never held waiting for the graphics processor.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED
EMBODIMENTS (BEST MODES FOR
CARRYING OUT THE INVENTION)

Figure 1:
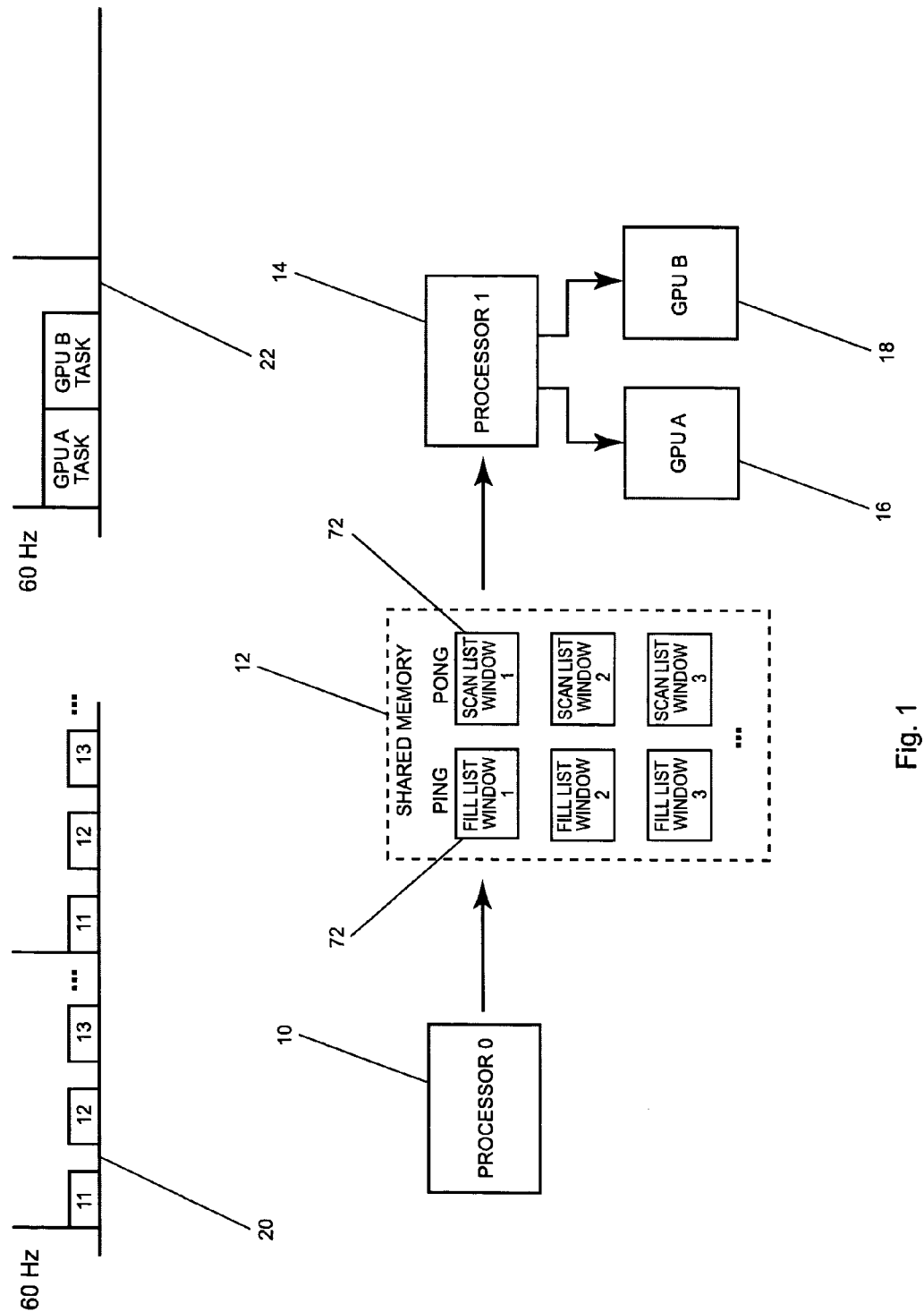
FIG. 1 is an overview of the relationship between the two processors.
Figure 2:
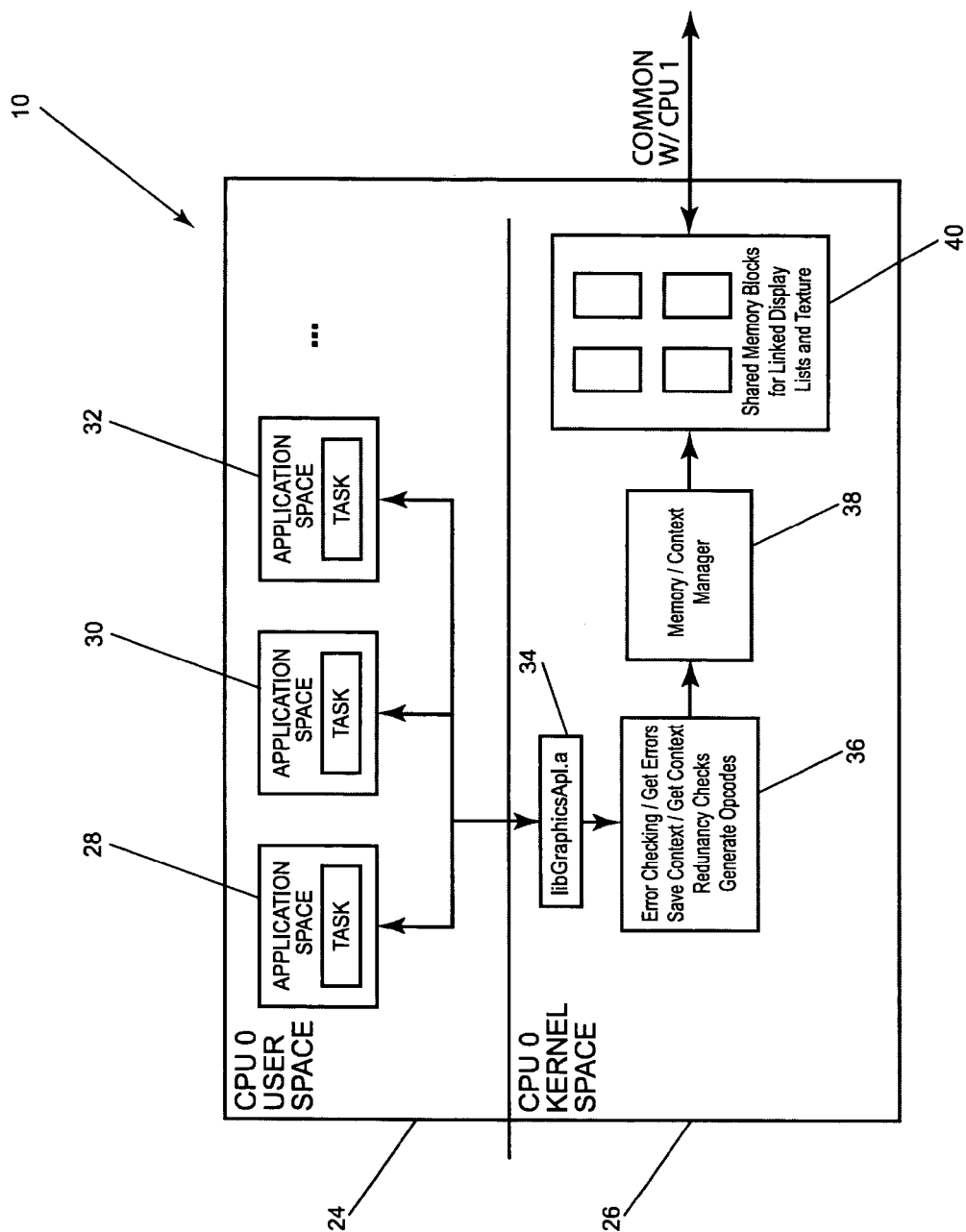
FIG. 2 is an overview of the tasking on processor 0.
Figure 3:
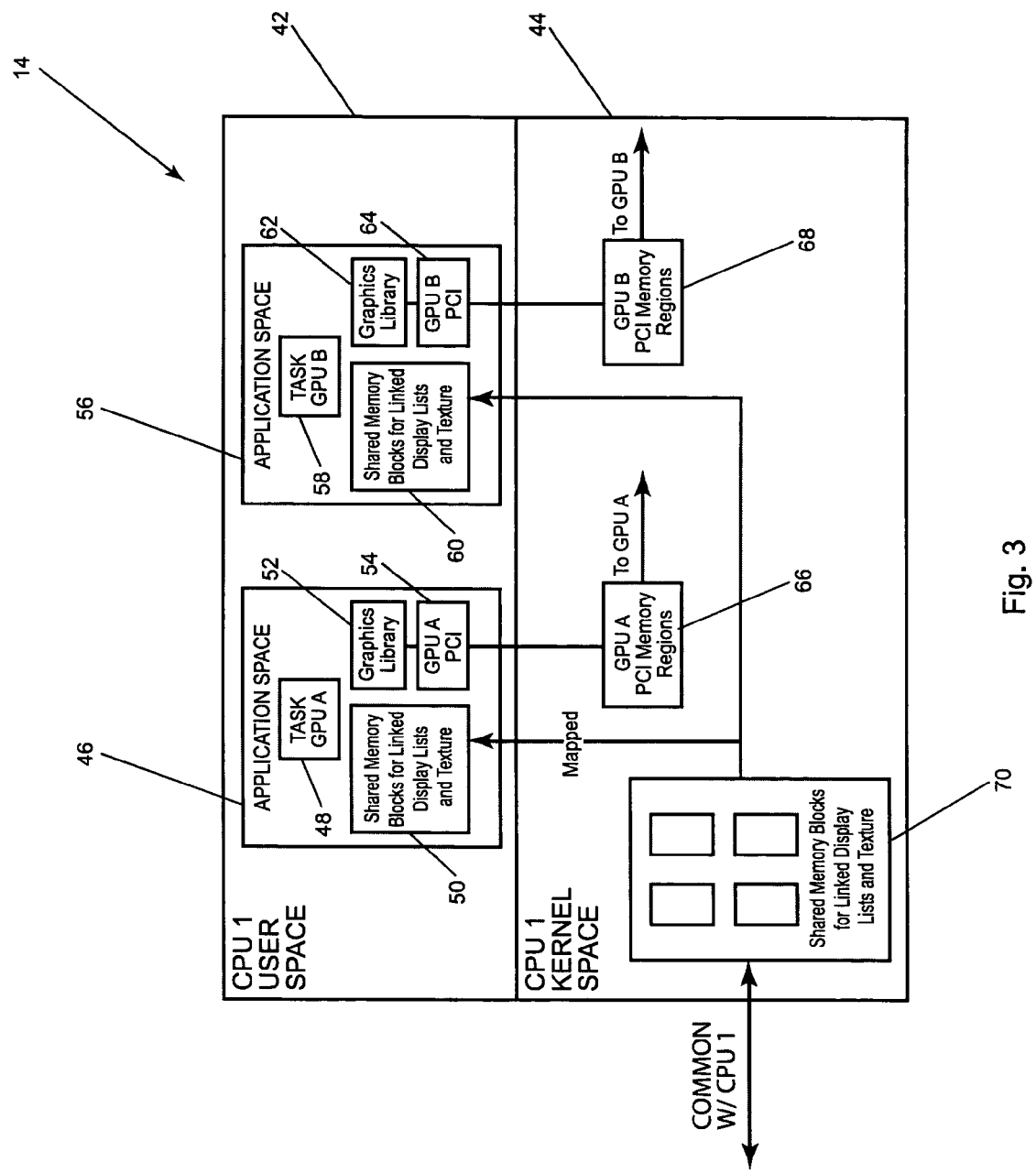
FIG. 3 is an overview of the tasking on processor 1.

The present invention is a method of utilizing two or more processors to increase graphics performance to a single screen. The preferred embodiment of the invention is shown in FIGS. 1-3. One processor 10 executes the application while the second processor 14 drives the GPU to render graphics. In this embodiment, a subset of OpenGL® with window/context functionalities is supported. Although OpenGL® is a common API, window/context functions are not consistent across all implementations. On application processor 10, an OpenGL® function call will not render graphics, but rather encode the instruction with parameters to common memory 12 shared with the graphics processor 14, which is much faster. The second processor 14 then decodes the graphics data from application processor 10 and executes a single application of executing all stored instructions. The lists are buffered, and a call to swap the buffers for that window causes the rendering processor 14 to begin executing that list of instructions.

The application processor 10 encodes all OpenGL® calls to common memory 12 shared between the processors. The instructions will be grouped by which window they are drawing to. This processor 10 also performs memory management for the buffered lists 72. Memory 12 is managed in blocks 40 rather than allocated, although either mechanism works. If more than one memory block is needed then there is an instruction pointer to another memory block. There are a fixed number of memory blocks 40 at startup. Memory blocks 40 are also used when transferring data to the GPU such as texture. In addition to encoding the OpenGL® calls, the application processor 10 also performs error checking on the parameters passed as well as validating the order the calls are made. Applications execute significantly faster than if they also are rendering the image.

The rendering processor 14 handles all calls in a single application, or two applications if two GPUs 16 and 18 are used. Two GPUs could be beneficial if applications are known to take excessive amounts of rendering time, or if one GPU is used for video processing and the other for primitive rendering. The invention can be scaled to as many GPUs as desired. Executing all calls to a GPU in a single application, allows for the GPU to function in a mode more efficient for generating displays. Displays are preferred to be generated at a fixed rate, which is the rate the display list application is operating at. Not having the rendering processor 14 time partitioned like the application processor 10 allows for the processor to take advantage of all processing time. Only the windows that are being changed need to be updated and this is handled by buffering the draw and scan frame buffers.

Another advantage of separating the graphics calls between processors is that extra processing can be done on the generated lists. The increased throughput allows time for additional processing to improve image quality. Additional line drawing algorithms can be added to improve the anti-aliasing. Haloing can also be added with no performance impact to the application. Improved display list processing can be implemented to enhance the OpenGL® functions. Lists can be stored and modified in shared memory 12 with almost no impact to the application, potentially generating tremendous amounts of updated rendering. Features can be added to sort the order of lists for priority. This method will create an abstraction layer for OpenGL® as well as graphics and context switching, which make it adaptable and more portable. The major advantage is the modular design of the application and the graphics which will reduce the effort to achieve FAA and DO178B certification and allow for upgrades to one or the other potentially without having to re-qualify both pieces.

FIG. 1 is an overview of the relationship between the two processors. Each processor or central processing unit (CPU) has a real time operating system with time and space partitioning. CPU 0 10 can have as many address spaces and time partitions as needed. The application processor CPU 0 10 encodes all OpenGL® calls to common memory 12 shared between the processors. In addition to encoding the OpenGL® calls, application processor CPU 0 10 also performs error checking on the parameters passed as well as validating the order of the parameters. Applications execute significantly faster than if they also were rendering the image. The instructions will be grouped by which window they are drawing to. CPU 1 14 has a partition for each hardware accelerator to be used. The instructions will be grouped by which window they are drawing to. Processor 0 10 has graphics applications with drivers that generate lists of OpenGL® and graphics service calls. The queues of graphics commands are all buffered so that CPU 1 14 can render out of a buffer in parallel to CPU 0 10 filling a queue. If multiple application tasks will be writing into the same window then a windows manager task will be needed on CPU 0 10 to coordinate the swapping of buffers. If only a single application on CPU 0 10 is allowed to fill a queue then the swapping of buffers can be coordinated by their respective application. The rendering processor CPU 1 14 then polls the status of the queues for each window. Whenever a queue has been swapped, CPU 1 14 begins operating out of that queue. In this way, only windows of the screen that are changed need to be updated.

Memory 12 is managed in blocks rather than allocated. If more than a memory block is needed then there can be an instruction pointer to another memory block. Preferably there are a fixed number of blocks at startup. The memory blocks will also be used when transferring data to the GPU such as texture data. Buffer lists are shown with a plurality of windows 72. Each window and or context has a list that also preferably contains header information, control instructions, status, and render statistics such as time. Processor 1 14 drives the graphics processors or graphics processing units (GPU).

This example has two graphics processors GPU A 16 and GPU B 18. Each GPU has hardware that provides accelerated raster rendering. Timeline A 20 is the timeline for tasks on processor 0 10. Timeline B 22 is the timeline for tasks on processor 1 14. Timelines A 20 and B 22 demonstrate how processor 0 10 can be time partitioned as needed by application processing while the graphics processing can remain at a fixed update rate which is optimal for displays processing.

FIG. 2 is an overview of the tasking on processor 0 10. CPU-0 kernel space 26 is a protected partition where the OS kernel executes. Kernel space is the partitioned memory dedicated for operation of the operating system. CPU 0 user space 24 is where applications execute. Address spaces 28, 30, and 32 are where the application tasks reside. Address spaces are partitioned memories dedicated for application tasks. Each address partition can have multiple tasks. Graphic library 34 exists in kernel space 26 so that multiple instances are not needed in every application space. Alternately, the graphics library can be directly linked to each application in user space. Some other functions can be performed on the graphics calls, such as a memory manager 36 that allocates fixed memory blocks as needed and shared memory blocks 38 for display lists and texture.

FIG. 3 is an overview of the tasking on processor 1 14. CPU 1 kernel space 44 is a protected partition where the OS kernel executes. CPU 1 user space 42 is the user space where the actual display rendering takes place. Application or address space A 46 and address space 56 are needed for each graphics processor that is being used. Each address space 46 and 56 have shared memory blocks 50 and 60 for the graphics calls for the windows that each GPU is rendering. The memory regions are mapped 70 in kernel space 44, but separated for their respective windows. Task A 48 and task B 58 write to their respective graphics libraries, graphic library A 52 and graphic library B 62. Graphics libraries 52 and 62 interface to kernel space 44 through PCI mapped memory regions, GPU A PCI 54 and GPU B PCI 64 and map directly to GPU A PCI memory region 66 and GPU B PCI memory region 68 in kernel space 44 respectively.

Although the example described above discuses two processors, multiple processors and/or cores could be used. Additionally, multiple graphics processing units could be used and a system to manage the time spent rendering could be implemented to share the workload among multiple graphics hardware. For specific systems, dedicated fixed rate graphics tasks could be hosted exclusively on the second processor, while still allowing more randomized graphics tasks from the application processor.

In an alternative embodiment, a window managing task could be implemented on the application processor to better manage only updating graphics when needed, or rendering by priority. Frequent called functions such as a font set could be hosted on the second processor so that the higher order graphics calls could be made from the application processor allowing for greater efficiency. Similarly, compiled display lists can be maintained on the second processor to reduce the throughput required for static symbology.

In a more deterministic system, there is typically a client and server for each window plus a single display server. This invention provides more flexibility relative to scheduling, because the rendering processor has almost 100% of its resources dedicated to the server functions. With a shared client/server on a single processor under a typical time partitioned operating system (OS), each window driver has to be allocated a worse case time for the client and the worse case time for its server. In many cases, the sum of the two worse case times is significantly larger than the worse case time of the combined client/server, because high times on the client or server do not necessarily translate to high times on the other side. In addition, there may well be numerous windows that are mutually exclusive; each of these have to be allocated time for both the client and the server. With this architecture, only the clients have to be allocated worse case times across all the windows, whereas the client servers only have to be allocated for the maximum number of active windows. For example, if there are 8 windows drivers of which only 4 are visible at any one time, with a conventional architecture, the one processor would have to allocate time for all 8 clients and all 8 servers plus the display server to guarantee sufficient time budget for each window. With this architecture, only the 8 clients have to be allocated, whereas the servers are reassignable to different clients, and thus, each server will only have to be scheduled with times to cover the summation of the 4 worst case servers (plus the single display server).

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method for optimizing graphic performance of at least one display, the method comprising the steps of:
   providing at least two processors, each of the at least two processors executing a real time operating system with time partitioning and space partitioning;
   driving a graphics hardware accelerator with a first processor from the at least two processors; and
   decoding graphics data generated by at least one second application processor from the at least two processors.

2. The method of claim 1 further comprising the step of optimizing an update rate of rendering the display by the first processor.

3. The method of claim 1 wherein the step of decoding graphics data comprises the step of encoding at multiple address partitions by the at least one second application processor.

4. The method of claim 3 wherein the step of encoding comprises tasking at different rates.

5. The method of claim 3 wherein the step of encoding comprises tasking at predetermined memory partitions.

6. The method of claim 1 further comprising the step of sharing memory resources by the first and the at least one second application processor.

7. The method of claim 6 wherein the step of sharing memory resources comprises managing memory blocks.

8. The method of claim 1 wherein the step of driving graphics hardware accelerator comprises driving at least one graphics processing unit.

9. The method of claim 1 wherein the step of driving comprises driving more than one graphics hardware accelerators.

10. An apparatus for optimizing graphic performance of at least one display comprising:
    at least two processors, each of the at least two processors executing a real time operating system with time partitioning and space partitioning;
    a first processor of the at least two processors for driving a graphics hardware accelerator; and
    at least one second processor of the at least two processors configured for decoding graphics information from at least one application.

11. The apparatus of claim 10 wherein said first processor comprises a decoder for decoding graphics data generated by said at least one second processor.

12. The apparatus of claim 11 wherein said graphics hardware accelerator comprises at least one graphics processing unit.

13. The apparatus of claim 11 wherein said graphics hardware accelerator comprises more than one graphics hardware accelerators.

14. The apparatus of claim 10 further comprising a single memory shared by the first processor and the at least one second processor.

15. The apparatus of claim 10 wherein said first processor comprises an optimized update rate for rendering a visual display.

16. The apparatus of claim 10 wherein the at least one second processor comprises encoders for encoding graphics data from multiple address partitions of the second processor.

17. The apparatus of 16 wherein said encoders comprises multiple rate encoders.

18. The apparatus of claim 16 wherein said encoders comprise a plurality of encoders each comprising an encoder in a predetermined memory partition.

* * * * *